United States Patent [19]

Park et al.

[11] Patent Number: 5,198,162
[45] Date of Patent: Mar. 30, 1993

[54] MICROPOROUS FILMS

[75] Inventors: George B. Park, Wiltshire; John A. Cook, Oxfordshire; Mike G. L. Dorling, Wiltshire; David J. Barker, Oxford; Robert H. McLoughlin, Wiltshire, all of England

[73] Assignee: Scimat Limited, England

[21] Appl. No.: 367,740

[22] Filed: Jun. 13, 1989

Related U.S. Application Data

[63] Continuation-in-part of Ser. No. 809,097, Dec. 16, 1985.

[30] Foreign Application Priority Data

Dec. 19, 1984 [GB] United Kingdom ............... 8432048
Jun. 13, 1988 [GB] United Kingdom ............... 8813932

[51] Int. Cl.$^5$ ........................................... B29C 67/20
[52] U.S. Cl. ....................................... 264/49; 264/41; 264/46.1
[58] Field of Search ............... 264/41, 49, DIG. 60, 264/46.1, 46.3

[56] References Cited

U.S. PATENT DOCUMENTS

| | | | |
|---|---|---|---|
| 3,556,161 | 1/1971 | Roberts | 264/49 |
| 3,679,614 | 7/1972 | Shah et al. | 264/49 |
| 3,859,402 | 1/1975 | Bintliff et al. | 264/49 |
| 3,930,094 | 12/1975 | Sampson et al. | 264/49 |
| 4,150,076 | 4/1979 | Baris et al. | 264/49 |
| 4,170,540 | 10/1979 | Lazarz et al. | 264/49 |
| 4,196,070 | 4/1980 | Chau et al. | 264/49 |
| 4,385,019 | 5/1983 | Bernstein et al. | 264/49 |
| 4,434,116 | 2/1984 | Covitch | 264/101 |
| 4,659,528 | 4/1987 | Plowman et al. | 264/105 |

FOREIGN PATENT DOCUMENTS

| | | |
|---|---|---|
| 188114 | 7/1986 | European Pat. Off. |
| 63-205332 | 8/1988 | Japan ............... 264/49 |
| 1078895 | 8/1967 | United Kingdom |
| 2168981 | 7/1986 | United Kingdom |

Primary Examiner—Robert A. Dawson
Assistant Examiner—Allan R. Kuhns
Attorney, Agent, or Firm—Lerner, David, Littenberg, Krumholz & Mentlik

[57] ABSTRACT

A microporous polymeric film of high porosity comprises a halopolymer in which the repeating units are —$(C_nH_{2n})$— and —$(C_mX_{2m})$— in which each X independently represents fluorine or chlorine and the values of n and m are greater than one and less than six. The film is the result of firstly melt processing a mixture of the halopolymer, more than 150 parts by weight of an extractable salt and not more than 80 parts by weight of an extractable polymer per 100 parts by weight of the halopolymer, the extractable polymer not being completely and homogeneously mixed with the halopolymer and being less viscous than the halopolymer when both are molten so that the surfaces of the film resulting from melt processing are rich in the extractible polymer, and secondly extracting at least some of the extractable salt to render the film porous and extracting at least some of said polymer to impart surface porosity to the film. The film has a porosity of more than 50% by volume and more usually 60-70%. The film may be used as the separator of an electrochemical cell e.g. a battery having a lithium anode and a thionyl chloride electrolyte.

18 Claims, 4 Drawing Sheets

MICROPOROUS FILMS

CROSS-REFERENCE TO RELATED APPLICATION

This application is a continuation-in-part of pending U.S. patent application Ser. No. 06/809,097, filed on Dec. 16, 1985.

FIELD OF THE INVENTION

This invention relates to microporous polymer films, to methods for making them, to a polymer composition used in their manufacture and to an electrochemical cell in which they are used.

BACKGROUND TO THE INVENTION

Microporous films are used in a wide range of applications, generally to provide a selective barrier. For example they may be used as battery separators, and electrolysis membranes as well as in breathable fabrics and medical and packaging applications. Commonly used polymeric films comprise polyolefins such as polyethylene and polypropylene which can conveniently be made porous by extraction of a soluble component. Such films are chemically inert towards many acids and alkalis and towards many reactive metals. However, there exist a number of solvents with which a polyolefin film cannot be used because of chemical incompatibility. Furthermore, the maximum operating temperature of polyolefin films is about 120° C., and their use in high temperature applications is therefore not possible.

U.S. Pat. No. 3,859,402 (Bintliff) describes the preparation of a thin microporous fluorocarbon polymer sheet material alleged to have a uniform microporosity which was useful in preparing electrodes capable of breathing oxygen from air. Fluorocarbon polymer articles were mixed with particles of a metallic salt pore former, the resultant mixture was formed into a sheet material and the metallic pore former (which was e.g. calcium formate, sodium chloride or sodium carbonate) was removed e.g. by dipping the sheet into water. The polymer could be polytetrafluoroethylene, polytrifluoroethylene, polyvinylfluoride, polyvinylidene fluoride, polytrifluorochloroethylene and copolymers thereof.

U.S. Pat. No. 4,613,441 (Kohno et al, assigned to Asahi) describes a process for making a thermoplastic resin having a critical surface tension of not higher than 35 dyne/cm into a membrane having a three-dimensional network structure of intercommunicating pores. The network structure is contrasted with a through-pore structure in which pores extend substantially linearly through the membrane from the front surface to the back surface. The network structure including communicating pores has high porosity combined with long path length compared to a through-pore membrane of the same thickness and the actual pore diameter is much smaller than the diameter of the pores exposed on the surface. An initial porosity is formed in the membrane using finely divided silica which is dissolved in aqueous sodium hydroxide to give a structure having an average pore diameter of 0.05–1 micron and a porosity of 30–70%. The membrane is then stretched by space drawing in at least one direction to enhance the porosity and at the same time improve mechanical strength. In one example an ethylene/tetrafluoroethylene copolymer (Tefzel 200) is formed into a porous membrane of thickness 75 microns, average pore diameter of 0.55 microns and porosity of 85% with an air permeability of 60 sec./100 cc 100 microns measured by method A of ASTM D-762. However, the above ASTM test is done using mercury porosimetry and does not give a true picture of the interconnection between the pores of the material which governs air flow through it.

The resistance of the ethylene/tetrafluoroethylene copolymer (Tefzel) and the ethylene/chlorotrifluoroethylene copolymer (Halar) to the chemically adverse environment of a lithium battery is described in U.S. Pat. No. 4,405,694 (Goebel et al), but only in the context of an insulation sleeve of non-porous material for a conductive jumper element.

SUMMARY OF THE INVENTION

The present invention provides a microporous polymeric film which comprises a halopolymer. Such films can be suitable for use in high temperature applications and can be substantially inert to certain chemically aggressive substances, for example alkali and alkaline earth metals.

In one aspect, the invention provides a microporous polymeric film comprising a halopolymer in which the repeat units are $-(C_n H_{2n})-$ and $-(C_m X_{2m})-$, where each X independently represents fluorine or chlorine and the values of n and m are greater than one and less than six, the film having a porosity of not less than 20% by volume.

Preferably, the film comprises a copolymer, for example one which comprises ethylene and tetrafluoroethylene as the monomer units, although chloroethylenes and fluorochloroethylenes can however also be used as the monomer units. In another embodiment, the film may comprise a copolymer that comprises longer chain monomer units such as propylene, butylene and halogenated analogues thereof. Particularly preferred halopolymers for use in the invention are those sold under the Trade Marks Tefzel (ethylene/tetrafluoroethylene) and Halar (ethylene/chlorotrifluoroethylene).

The term "film" is used to denote a non-fibrous self-supporting sheet. A microporous film is a porous film in which the details of pore configuration and/or arrangement are discernable only by microscopic examination. Preferably the pores or open cells in the films are smaller than those which can be seen using an optical microscope, when electron microscopy techniques may be used to resolve details of the pore structure. Generally, the maximum dimension of a substantial number of the pores will be less than 5 micrometers, preferably less than 2 micrometers, measured by mercury intrusion porosimetry according to ASTM D 2873-70.

Microporous films of the halopolymers defined above have chemical and physical properties which are advantageous for use in a variety of high performance applications, such as battery separators, and electrolysis membranes, as well as for less demanding applications such as in breathable fabrics, and in packaging and medical applications.

A significant advantage of the microporous film of the invention, is that it can be used in high temperature applications. For example a film formed from Tefzel may be used at temperatures up to at least about 175° C. without significant change in dimensions or porosity. The superior high temperature performance of the films of the invention allows them to be used in high temperature applications, for example, high temperature electrochemical cells where previously used microporous films cannot function.

In accordance with the invention, films can be produced which are chemically inert towards reactive metals commonly used as anodes in electrochemical cells, such as for example metals of Groups I and II of the periodic table. This property of the films is surprising in view of the reactivity, towards lithium and sodium (at least), of the well-known halogenated polymers polyvinylidene fluoride (PVF$_2$) and polytetrafluoroethylene (PTFE).

The films of the invention can also be chemically inert towards many aggressive liquids found for example in electrochemical cells, electrolysis cells and in other applications. Thus, the preferred films of the invention are inert towards acids and alkalis, as well as towards reactive fluids such as oxyhalides of elements of Group VA and Group VIA of the periodic table (as published in The Condensed Chemical Dictionary, 9th Edition, Van Nostrand Reinhold, 1977), for example thionyl chloride, sulphuryl chloride and phosphoryl chloride. The films can therefore be used in many applications where the use of cumbersome non-woven glass fibre mats has previously been unavoidable, and a significant saving in size and weight may also thereby be obtained. An example of such an application is as a separator in a lithium/thionyl chloride cell. Accordingly, in another aspect, the invention provides an electrochemical cell in which the separator comprises a microporous film which comprises a halopolymer in which the repeat units are —$(C_n H_{2n})$— and —$(C_m X_{2m})$—, where each X independently represents fluorine or chlorine and the values of n and m are greater than one and less than six.

In a further aspect, the invention provides a method of making a polymeric film having a porosity of not less than 20% which comprises providing a film of a polymer composition comprising:
(a) a halopolymer in which the repeat units are —$(C_n H_{2n})$— and —$(C_m X_{2m})$—, where each X independently represents fluorine or chlorine and the values of n and m are greater than one and less than six;
(b) at least one extractable component which is substantially insoluble in the halopolymer;
and subsequently extracting at least some of the extractable component so as to render the film microporous.

The method enables microporous films of halopolymers to be made conveniently. In one form of the invention, by careful selection of the extractable components, a porosity of not less than 30% by volume, for example not less than 40% can be achieved. Preferably the polymer composition comprises an extractable salt and an extractable polymer. The extractable salt may be present in an amount of from 10 to 150 parts per 100 parts of the halopolymer, preferably from 50 to 120 parts, especially from 95 to 105 parts. The extractable polymer may be present in an amount of not more than 60 parts per 100 parts of the halopolymer, preferably from 5 to 30 parts, especially from 20 to 25 parts. The proportions of the components of the composition may be varied, depending on such factors as the desired porosity of the film, the desired porosity profile through the thickness of the film, the size of the pores, the nature and chemical compatibilities of the components.

A high porosity can be achieved using a combination of extractable polymer and salt, and although the reasons for this are not fully understood, it would appear that the extractable polymer makes easier the extraction of the salt from the halopolymer matrix, possibly by acting as a wetting agent. Furthermore, as shown by scanning electron micrographs of a film produced by the preferred method, the presence of the extractable polymer appears to increase the surface porosity of the film compared with the porosity of films prepared by extraction of a salt alone, in which latter films the surface porosity limits performance significantly.

In another aspect, the invention provides a polymer composition which comprises:
a) a halopolymer in which the repeat units are —$(C_n H_{2n})$— and —$(C_m X_{2m})$—, where each X independently represents fluorine or chlorine and the values of n and m are greater than one and less than six;
b) an extractable salt;
c) an extractable polymer.

The porosity of the films as aforesaid may advantageously be not less than 30%, preferably not less than 40% by volume, for example from 40 to 50% by volume, measured by mercury intrusion porosimetry, again according to ASTM D2873-70.

It has been found, according to a further aspect of the invention, that the presence in admixture with the aforesaid halopolymer of an extractable polymer that when molten is incompatible with the halopolymer and has a lower viscosity than the halopolymer enables high proportions of extractable salt to be incorporated into the extruded film and higher porosities to be obtained than those mentioned above.

Thus the invention provides a polymeric film which comprises a halopolymer as aforesaid, characterised in that:
(a) the film is the result of firstly melt processing a mixture of the halopolymer, more than 150 parts by weight of an extractable salt and not more than 80 parts by weight of extractable polymer per 100 parts by weight of the halopolymer, said extractable polymer not mixing completely and homogeneously with the halopolymer and being less viscous than the halopolymer when both are molten so that the surfaces of the film resulting from melt processing are rich in the extractable polymer, and secondly extracting at least some of the extractable salt to render the film porous and extracting at least some of said polymer to impart surface porosity to the film; and
(b) the film has a porosity of more than 50% by volume.

Generally the maximum dimension of a substantial number of the pores will be less than 5 micrometers, preferably less than 2 micrometers, measured by mercury intrusion porosimetry according to ASTM D-2873-70.

The porosimetry of the films in the above mentioned higher porosity forms may advantageously be above 55% and preferably equal to or above about 60–70% measured by density.

A significant advantage of the films of the invention which flows from the use of the extractable polymer is their high surface porosity. When highly filled polymers are melt processed, there is a tendency for the resultant product to have a polymer rich skin. For most conventional uses this is an advantage since it allows less expensive polymer compositions to be used by the introduction of relatively coarse filler particles whilst retaining a smooth surface finish in the resulting moulded product. But in the use of highly filled compositions to make a microporous membrane by melt processing followed by removal of the filler, the surface skin of polymer is a positive disadvantage. The surface skin impedes access of the extracting liquid to the filler particles so that their rate of dissolution is reduced and complete dissolution may not be possible. A further problem is that the membranes are inhomogeneous and their properties are determined by the relatively non-porous surface layer. These difficulties are reduced or overcome by the extractable polymer which during melt processing of the highly filled fluorocarbon polymer to form a film is incompatible with the halopolymer and migrates to the major surfaces of the film and prevents the formation of a skin of homogeneous halopolymer. When the extractable salt and polymer are removed by immersing the film in a solvent therefor e.g. an aqueous acid or alkali a highly porous surface is produced which communicates the pore structure in the body of the film with the opposed faces thereof.

The nature of the pore structure at the major surfaces of the membranes of the invention is apparent from the accompanying FIGS. 1 and 2 which are micrographs of the major surfaces of otherwise similar films may with and without the presence of polyethylene oxide as extractable polymer. The film of FIG. 1 is seen to have a large number of pores or voids 10 through its surface, whereas the film of FIG. 2 has a lesser number of voids 10 and a large number of regions 12 that appear as shadows in the micrograph and are cavities beneath the surface of the membrane that have not developed into avoids through it because they are closed by a thin skin layer of halopolymer. These differences in appearance correspond to performance differences, the membrane of FIG. 1 having a resistivity of 12-15 ohms cm$^2$, whereas that of the membrane of FIG. 2 measured in the same cell under the same conditions was 55-60 ohms cm$^2$.

The invention further provides a method of making a polymeric film having a porosity of not less than 50% by volume, which comprises:

(a) mixing together a first component which is a halopolymer in which the repeating units are —C$_n$H$_{2n}$)— and —(C$_m$X$_{2m}$)— in which each X independently represents fluorine or chlorine and the values of n and m are greater than one and less than six, more than 150 parts by weight per 100 parts by weight of the halopolymer of a second component which is an extractable salt and not more than 80 parts by weight per 100 parts by weight of the halopolymer of a third component which is an extractable polymer, the extractable polymer being less viscous than the halopolymer and incompatible therewith when both are molten;

(b) melt processing the mixture to form a film in which the extractable polymer has migrated to the surfaces; and (c) extracting at least some of the extractable salt to convert the film into a three-dimensional network structure including communicating pores and extracting at least some of said polymer to increase the number of pores opening through the major surfaces of the film.

The invention also provides a polymer composition for extrusion into a film as aforesaid, which comprises:

(a) a halopolymer in which the repeating units are —(C$_n$H$_{2n}$)— and —(C$_m$H$_{2m}$)— in which each X independently represents fluorine or chlorine and the values of n and m are greater than one and less than six;

(b) more than 150 parts by weight of an extractable salt; and (c) not more than 80 parts by weight of extractable polymer per 100 parts by weight of the halopolymer.

The invention yet further provides a method for manufacturing a porous film which comprises melt processing into film a mixture of a plastics material and at least two additives, one of which is incorporated into the body of the film and the other of which migrates preferentially (but not necessarily completely) to the surface of the film, extracting at least some of said one additive to render the film porous and extracting at least some of said other additive to impart surface porosity to the film, wherein the resulting film has a porosity of more than 50% by volume.

The method as aforesaid has enabled the production of films of novel structure. Thus the invention provides a polymeric film which comprises a halopolymer in which the repeating units are —(C$_n$H$_{2n}$)— and —(C$_m$X$_{2m}$)— in which each X independently represents fluorine or chlorine and the values of n and m are greater than one and less than six, the film having a porosity of more than 55 and preferably 60–70% by volume.

The invention also provides a polymeric film which is undrawn after formation of its pore structure and which comprises a halopolymer in which the repeating units are —(C$_n$H$_{2n}$)— and —(C$_m$X$_{2m}$)— in which each X independently represents fluorine or chlorine and the values of n and m are greater than one and less than six, the film having a three-dimensional microporous structure including intercommunicating pores that give rise to a high level of tortuosity between the membrane surfaces, having a porosity of not less than 60% by volume, a thickness of 15 to 200 microns and a highly porous surface such that the airflow through the membrane is at least 200 cm$^3$cm$^{-2}$min$^{-1}$ at 20 psi.

A further surprising finding is that the molecular weight of the extractable polymer influences the mean pore size, surface porosity and tortuosity factor (the ratio between pore length and membrane thickness) of the polymeric film produced and enables the production of films of novel structure. In particular the invention provides a method of making a polymeric film having a volume porosity of not less than 20% (and preferably not less than 50%) which comprises providing a film of a polymer composition, the composition comprising (a) a halopolymer in which the repeat units are —(C$_n$H$_{2n}$)— and —(C$_m$X$_{2m}$)— where each X independently represents fluorine or chlorine and the values of n and m are greater than one and less than six, and (b) at least one extractable salt and at least one extractable polymer which is substantially insoluble in the halopolymer, and subsequently extracting at least some of the extractable component so as to render the film porous, wherein the extractable component is a polyalkylene oxide homopolymer or copolymer or polymeric material of molecular weight less than 1 million.

The use of a lower molecular weight polyalkylene oxide which is solid at room temperature and is of molecular weight less than 1 million e.g. of molecular weight 20,000–750,000, especially about 100,000 together with more than 150 parts of extractable salt and not more than 80 parts by weight of extractable polymer per 100 parts by weight of the halopolymer provides for further novel film structures to be produced.

Thus the invention provides a polymeric film which comprises a halopolymer in which the repeating units are —(C$_n$H$_{2n}$)— and —(C$_m$H$_{2m}$)— in which each X independently represents fluorine or chlorine and the values of n and m are greater than one and less than six, the film having a porosity of not less than 30% by volume (preferably not less than 55% by volume and especially 60–70% by volume) and
  (i) a mean pore size greater than 0.7 um, (preferably above 1.0 um and especially about 1.5 um); and/or
  (ii) a surface porosity of more than 30%, (preferably more than 35% and especially about 50%), and/or
  (iii) a tortuosity factor of not more than 2.5, especially about 1.5.

The invention yet further provides an electrochemical cell in which the separator comprises a microporous film, said film comprising a halopolymer in which the repeating units are —$(C_nH_{2n})$— and —$(C_mX_{2m})$— in which each X independently represents fluorine or chlorine and the values of n and m are greater than one and less than six, the film having a porosity of 60–70% by volume.

The invention yet further provides an electrochemical cell comprising a container having two electrically isolated terminals, the container having therein an anode connected to one terminal, a cathode connected to the other terminal, a fluid electrolyte, an ionizable solute dissolved in the electrolyte and a separator positioned between and in contact with the anode and the cathode, wherein the separator comprises a polymeric film which comprises a halopolymer in which the repeating units are —$(C_nH_{2n})$— and —$(C_mX_{2m})$— in which each X independently represents fluorine or chlorine and the values of n and m are greater than one and less than six, and:

(a) the film is the result of firstly extruding a mixture of the halopolymer, more than 150 parts by weight of an extractable salt and not more than 80 parts by weight of extractable polymer per 100 parts by weight of the halopolymer, said extractable polymer being less viscous than the halopolymer and incompatible therewith when both are molten so that the surfaces of the film resulting from extrusion are rich in extractible polymer, and secondly extracting at least some of the extractable salt to render the film porous and extracting at least some of said polymer to impart surface porosity to the film; and (b) the film has a porosity of more than 50% by volume.

The invention also provides a cell as aforesaid in which the mean pore size is more than 0.7 um, the surface porosity is at least 35% and the tortuosity factor is not more than 2.5.

DESCRIPTION OF PREFERRED FEATURES

Figure 1:
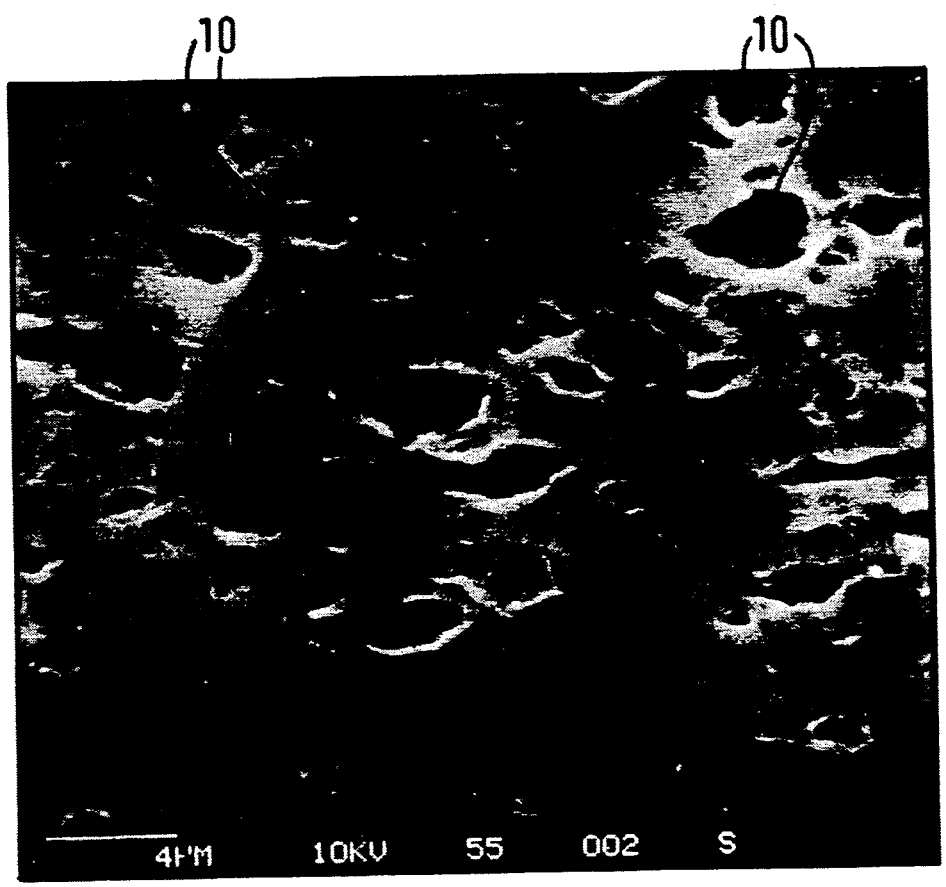
FIG. 1 is a micrograph of a membrane having a resistivity of 12–15 ohms cm$^2$.
Figure 2:
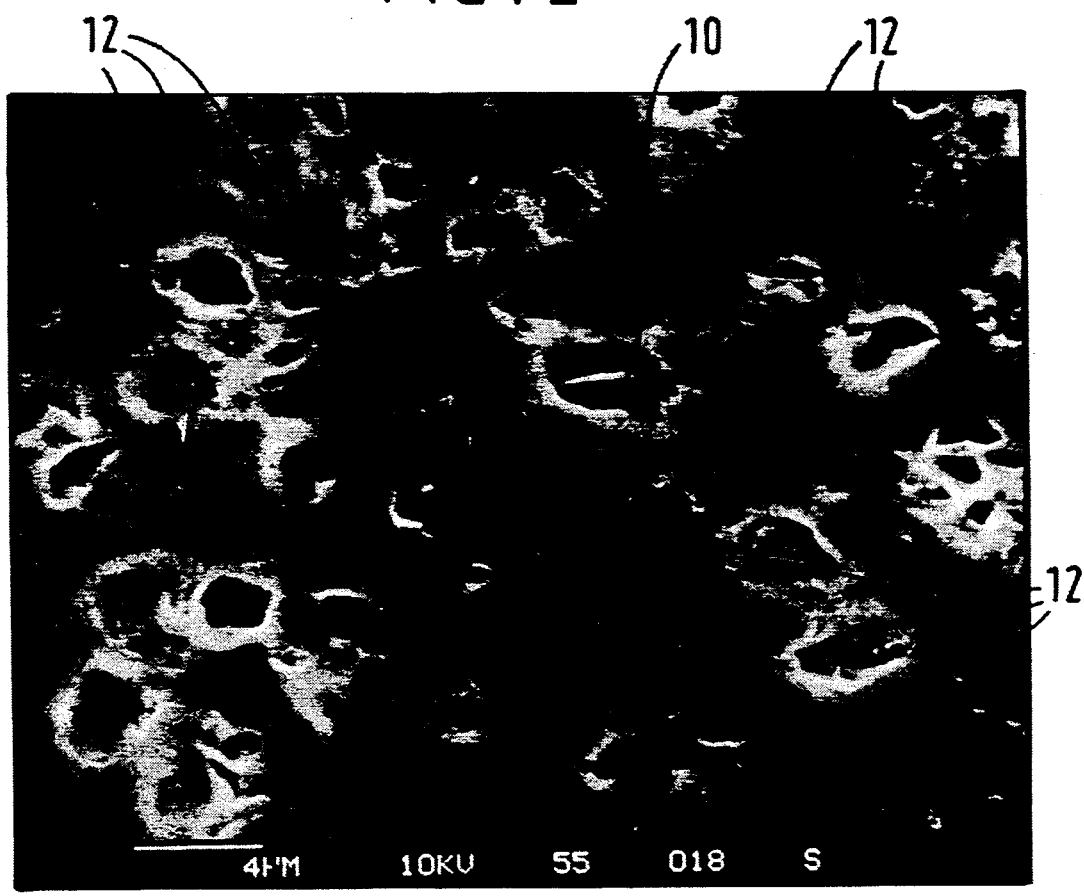
FIG. 2 is a micrograph of a membrane having a resistivity of 55–60 ohm cm$^2$.

For some applications, it will be acceptable for some of the extractable polymer or the salt or both to remain in the halopolymer matrix after extraction. Generally however, it is preferred that substantially all of the polymer and salt are extracted from the matrix, since the porosity is thereby maximised.

It is particularly preferred that the extractable polymer and the salt are selected to be soluble in one solvent. This makes more convenient the extraction of polymer and salt since significantly fewer extractions need be performed. For convenience, the polymer and salt will be selected to be soluble in an aqueous solvent, such as water or an aqueous acid solution. Other solvents may, however, be selected. In some applications, the extracting solvent may be a liquid with which the film comes into contact when in use, such as for example the electrolyte of an electrochemical cell.

The extractable salt may be present in an amount of from 150 to 300 parts per 100 parts by weight of the halopolymer, preferably from 150 to 200 parts. It should be selected according to the end use of the porous film, since at least a small amount of the salt is likely to remain in the film after extraction, and any remaining salt must be chemically compatible with other materials with which the film comes into contact when in use. For example, if the film is to be used as a separator in an electrochemical cell which has a reactive metal anode, the extractable salt should be electrochemically compatible with other cell components. Thus the salt should be of a metal which is at least as electropositive as the metal of the anode. For example, when the film is to be used as a separator in a lithium cell, the salt should be a lithium salt. Preferred lithium salts include in particular the carbonate which has a high decomposition temperature, can withstand the temperatures needed to process fluorocarbons, and is compatible with lithium battery systems, also the chloride, phosphate and aluminate, and less preferably the nitrate, sulphate, trifluoromethyl sulphonate and tetrafluoroborate. In the finished film the effect of the increased amount of the lithium carbonate is to increase the amount of air flow through the membrane (which correlates to separator conductivity). It has been found e.g. when using lithium carbonate that it is advantageous from the standpoint of the porosity of the eventual membrane to grind the lithium carbonate in a fluid energy mill or particle collider, and to grind to a nominal upper limit of particle size of more than 6 microns, typically to a nominal upper limit of particle size of 15 or 25 microns. These relatively large sizes still enable relatively high loadings of lithium carbonate to be achieved in the extruded film and enable a finished film of thickness about 50 microns to be produced. Surprisingly, particles of maximum size less than 25 microns can be incorporated into a 50 micron film although from a manufacturing standpoint 60 microns is preferred with particles of this size. The increase in airflow is believed to be the result of an increase in the size of the interconnection holes. A ninefold increase in airflow through the membrane has been achieved in highly porous membranes according to the invention when compared to those of our earlier patent specification No. EP-A-0188114, and the mean pore size has increased from 0.1 to 0.5 microns measured using a Coulter poromiter.

The extractable polymer is incompatible with the fluorocarbon polymer (i.e. does not substantially mix therewith when both are molten) and has a lower viscosity when molten than the molten fluorocarbon polymer when both are at the same temperature. It may advantageously be present in an amount of not more than 60 parts by weight per part by weight of the halopolymer. It is selected to have a solubility in the extracting solvent that is significantly higher than the solubility of the halopolymer. When water or another aqueous based solvent is selected as the solvent, the extractable polymer may be selected from the following list (which is not exhaustive):
alkylene oxide homo- and copolymers;
vinyl alcohol homo- and copolymers;
vinyl pyrrolidone homo- and copolymers;
acrylic acid homo- and copolymers;
methacrylic acid homo- and copolymers.

Certain naturally occurring polymers such as polysaccharides may also be used as the extractable polymer component in certain applications.

Particularly preferred materials are ethylene oxide polymers such as that sold under the trade name Polyox. The use of ethylene oxide polymers (PEO) as the extractable polymer is advantageous since they are water soluble and melt processable. It is, however, surprising that polyethylene oxide is not substantially degraded in the high temperature high shear conditions used to extrude PTFE. Degradation of PEO is accelerated in acidic media and trace amounts of HF are given off during extrusion of a fluorocarbon polymer such as Tefzel which would be expected to catalyse the degradation of the PEO. It is believed that the lithium carbonate used as extractable salt also functions as an acid acceptor for HF and thereby enables the PEO to survive long enough to pass through the extruder. The molecular weight of the e.g. polyethylene oxide homopolymer may be in the range from 20,000-5 million and a material of molecular weight about 4 million. (Polyox WSR 301—Trade Mark) has been used with satisfactory results. For the production of high porosity materials it may be desirable to use materials that are solid at room temperature but are of lower molecular weight e.g. Polyox WSRW 750 (molecular weight about 300,000) and Polyox N 10 (molecular weight 100,000).

It has also been found advantageous to add a process aid or plasticiser to the composition in an amount of 1-3% by weight of the total weight of the formulation. The plasticisers that it has been found advantageous to use are triallyl cyanurate and triallyl isocyanurate which are more commonly used as radiation cross-linking enhancer. The effectiveness of these compounds as plasticisers under the severe processing conditions encountered in the melt processing stage of the film manufacture is a further surprising feature of the invention. Other process aids or plasticisers that might be used include high temperature plasticisers, e.g. phosphate plasticisers such as Reofos 95 (Ciba Geigy), or tritolyl phosphate.

It will be understood that in some circumstances, it will be appropriate to add other components to the polymer composition such as antioxidants, UV stabilisers, processing aids, dispersal aids, cross-linking agents, radiation cross-linking enhancers (prorads) and/or radiation cross-linking inhibitors (antirads) and so on.

The components of the film may be blended using conventional polymer blending apparatus such as a twin screw extruder or a two-roll mill. The film is preferably formed as a thin strip or sheet, and it may be made in this form by a melt processing technique, for example by extrusion, although blow and compression moulding techniques are examples of alternative techniques that might be used. Melt processing techniques are desirable because they allow films to be made with consistent properties and permit the production of thin films. Furthermore melt processing techniques allow a film to be made continuously. The film may be extruded onto, or coextruded with, another component with which it will be in contact when in use. Once formed, the film may be cut into pieces of suitable size, or it may be formed into a roll for ease of transportation and storage.

For certain applications, it may be advantageous to cross-link the polymer of the film. This may be effected by irradiation, for example by electron or gamma radiation, or by use of a chemical cross-linking agent.

The chosen final thickness of the film is dependent on the end use, and factors such as the desired strength, flexibility, barrier properties and so on will generally have to be considered. The materials of the film may be produced to a thickness of less than 150 micrometers, advantageously less than 75 micrometers and typically 50-70 micrometers.

The method may include the step of deforming the film so as to reduce its thickness prior to extraction of the extractible component. The film may be deformed by up to 25%, up to 50% or up to 80% or more, depending on, for example: the dimensions of the film, the desired nature of the pores, the nature of the halopolymer and the extractible components. The deformation is preferably carried out using rollers, for example nip rollers in line with an extrusion die, although other techniques including stretching of the film may be used. Deformation of the film can increase the efficiency of the extraction step and can also affect the nature of the pores. For example passing the film through nip rollers can affect the tortuosity of the pores. The benefit of deformation prior to extraction of the filler is that the unextracted filler increases the likelihood of local rupturing of the film between individual particles of filler so that when the filler is extracted inter-pore communication is increased. Stretching after the filler has been removed is less advantageous since it increases pore size but does not correspondingly increase pore interconnection.

The microporous film of the invention may be used to protect sensitive material for greater convenience during handling. For example it may be used to protect sensitive electrode material such as reactive metal anodes, for example lithium anodes, as disclosed in EP-A-143562.

EXAMPLE 1

Figure 3:
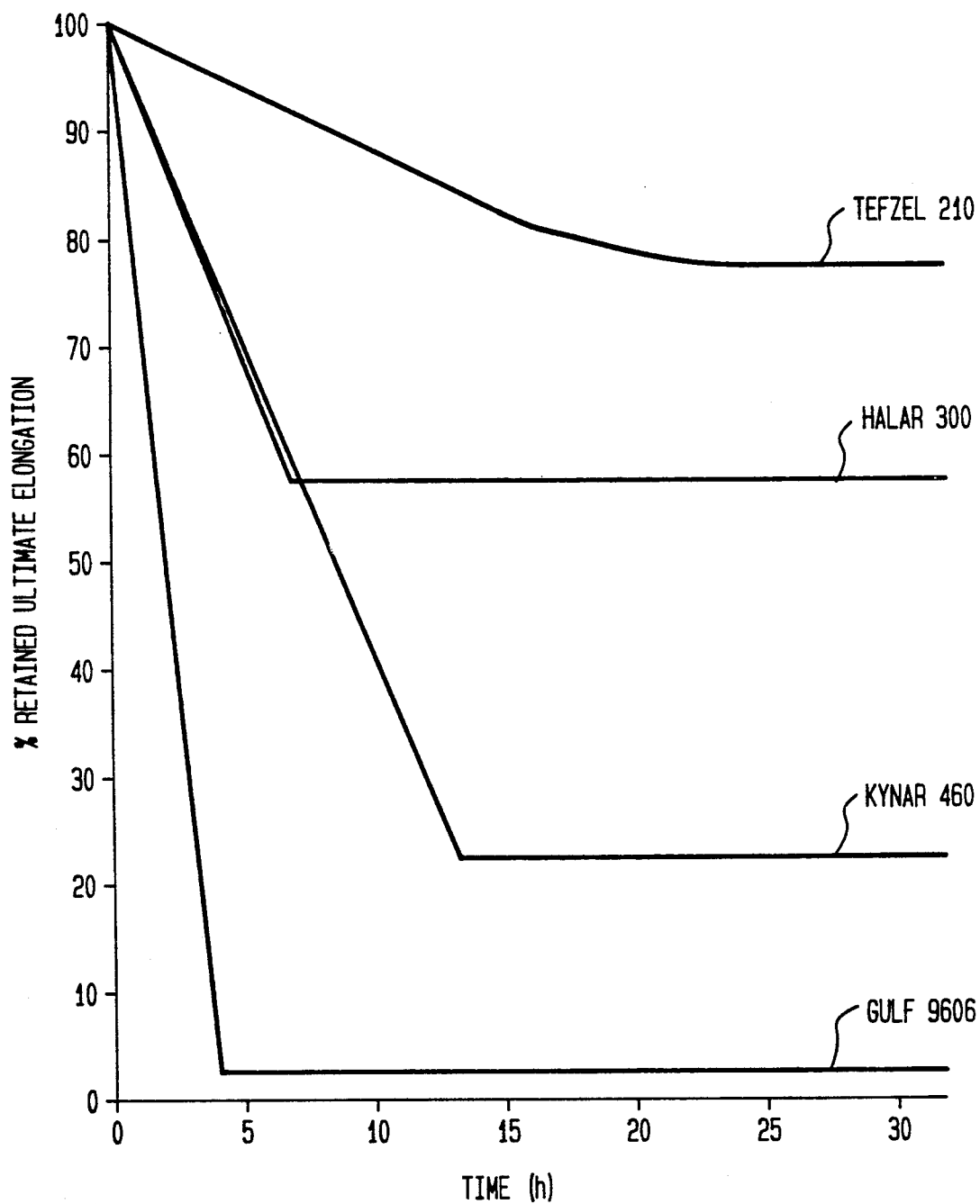
FIG. 3 illustrates the percentage of initial ultimate elongation which is retained by various polymeric films suitable for use in the process of this invention after exposure to an electrolyte.

Non-porous samples of ethylene/tetrafluoroethylene copolymer (Tefzel 210), ethylene/chlorotrifluoroethylene copolymer (Halar 300), polyvinylidene fluoride (Kynar 460—Trade Mark) and polyethylene (Gulf 9606 Trade Mark) were maintained in a 1.9M solution of $LiAlCl_4$ in $SOCl_2$ under reflux, and the effect on the ultimate elongation of the samples was monitored. The results are shown in FIG. 3, expressed in terms of the percentage of the initial ultimate elongation which was retained after the exposures. The measurements were made at room temperature.

Samples of Tefzel 210 and Halar 300 were also maintained in a 1.9M solution of $LiAlCl_4$ in thionyl chloride ($SOCl_2$) at room temperature. The effect of the treatment on the mechanical properties of the samples is shown in Table 1, the results being expressed as in FIG. 3.

TABLE 1

|  | % Retained Tensile Strength | % Retained Ult. Elongation |
|---|---|---|
| (a) 8 weeks at room temperature: | | |
| Tefzel 210 | 88 | 92 |
| Halar 300 | 75 | 93 |

TABLE 1-continued

|  | % Retained Tensile Strength | % Retained Ult. Elongation |
|---|---|---|
| (b) 32 hours under reflux at 85° C.: | | |
| Tefzel 210 | 90 | 77 |
| Halar 300 | 61 | 57 |

EXAMPLE 2

The stability of polytetrafluoroethylene (Zitex G110—Trade Mark), Kynar 460, Halar 300 and Tefzel 210 towards lithium metal was evaluated at elevated temperature. Samples of the four polymeric materials were dried by placing them in a vacuum oven at 150° C. for 8 hours. The samples were then maintained in contact under pressure with lithium in a dry environment at 85° C. for 16 days. The following results were obtained on inspection:

Tefzel 210: No change in the appearance of lithium or of Tefzel.
Halar 300: Lithium blackened over approximately 80% of the surface which contacted the polymer sample.
Kynar 460: Lithium blackened over approximately 95% of the surface which contacted the polymer sample.
Zitex G110: Lithium blackened over the entire surface which contacted the polymer sample, and bonded weakly to the sample.

EXAMPLE 3

Ethylene/tetrafluoroethylene copolymer (Tefzel 210), lithium carbonate and polyethylene oxide (Polyox WSR 301—Trade Mark) were compounded using a Baker Perkins twin screw extruder to give a blend containing 100 parts Tefzel, 100 parts lithium carbonate and 22 parts Polyox. The compound was further extruded using a Leistritz single screw extruder to produce a film of thickness 0.2 mm which was rolled using rollers at a temperature in the range 140°-220° C. to produce film having a thickness of approximately 27 micrometers. This thinned film was then treated with concentrated HCl at room temperature (c. 23° C.) to remove the lithium carbonate and Polyox leaving a microporous web of Tefzel. The excess acid and reaction products were removed by washing with distilled water prior to drying of the film. The porosity of the resulting film, determined according to ASTM D2873-70, was found to be 45%.

EXAMPLE 4

Figure 4:
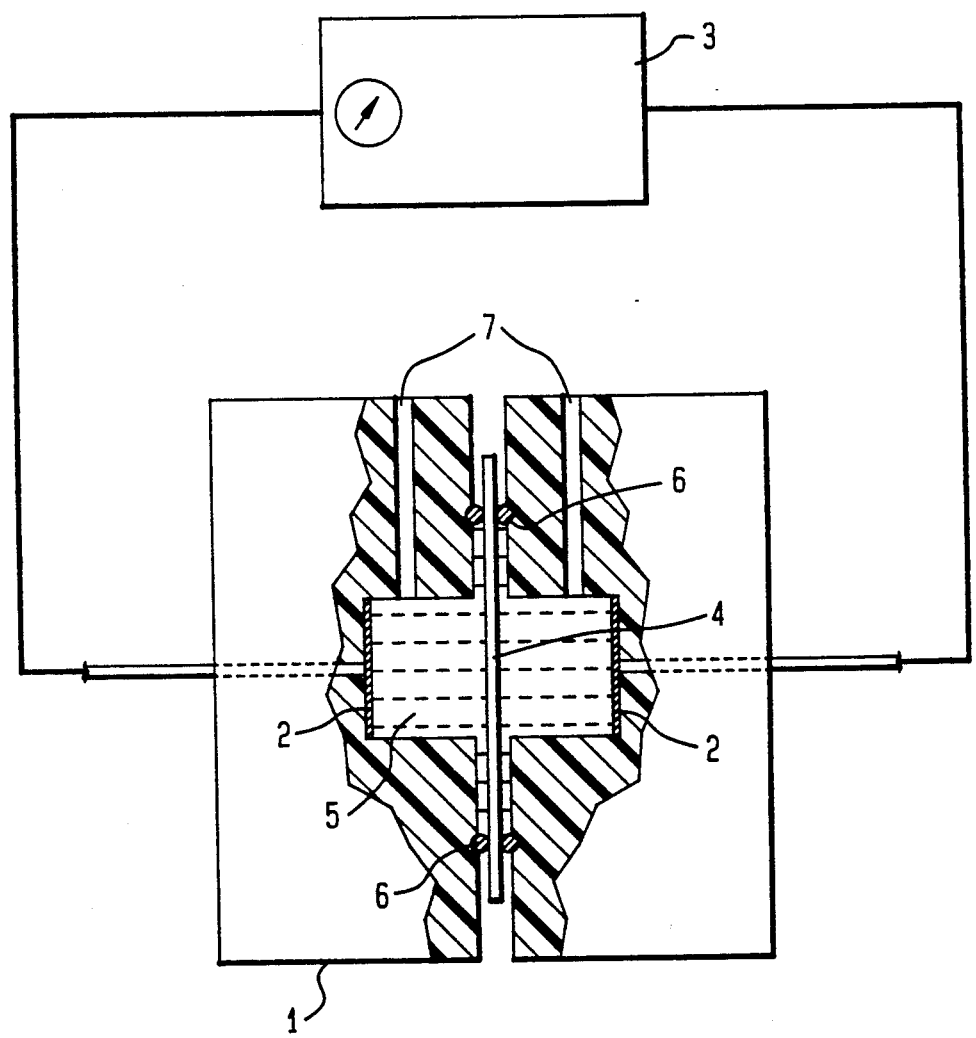
FIG. 4 is a schematic view of a test cell incorporating film samples prepared by the process of this invention.

The electrical resistance of a porous Tefzel film, prepared by the method described in Example 3, was measured in three different electrolytes using a test cell as shown in FIG. 4 of the accompanying drawings. As shown in FIG. 4, the cell comprises a container 1 incorporating electrodes 2 of stainless steel connected to a C conductance bridge 3. A sample 4 to be tested is sealed into the test chamber 5 by sealing gaskets 6, and the necessary conductive liquid is introduced via feed ports 7.

The results are given in Table 3:

TABLE 3

| Electrolyte | Resistance at 30° C. (ohm cm$^2$) |
|---|---|
| 1.9 Molar LiAlCl$_4$ in SOCl$_2$ | 4 |
| 1.0 Molar LiClO$_4$ in 50/50 Propylene carbonate 1,2-dimethoyoxyethane | 7 |

TABLE 3-continued

| Electrolyte | Resistance at 30° C. (ohm cm$^2$) |
|---|---|
| 30% ww KOH in water | 0.45 |

EXAMPLE 5

Tefzel 210 and lithium chloride in the ratio 40:60 were blended using a Leistritz twin screw extruder. The resulting blend was then re-extruded to produce a web having a width 40 cm and thickness 0.5 mm. The thickness of the web was then reduced to 0.15 mm by passing it through the nips of a calendar roller stack. The web was soaked in water to leach out the lithium chloride, and then dried thoroughly. The porosity of the film was found to be 48% by volume.

The film was used as a separator in a test cell as described above, in which the electrolyte was 1.9M LiAlCl$_4$ in SOCl$_2$. The resistance of the film was measured using a conductivity bridge, and found to be 161 ohm cm$^2$ at room temperature.

EXAMPLE 6

Ethylene/tetrafluoroethylene copolymer (Tefzel 210), lithium carbonate and polyethylene oxide (Polyox WSR 301—Trade Mark) were very thoroughly compounded using a twin screw compounding extruder to give a homogeneous blend containing 100 parts Tefzel, and lithium carbonate and Polyox in the amounts indicated in the Table below. Where plasticiser is added to the above mixture, it is tumble blended until homogeneously mixed. The compound was further extruded using a single screw extruder to produce a film of thickness 0.1 mm which was rolled using rollers at a temperature in the range 100°-175° C. to produce film having a thickness of approximately 50 micrometers. This thinned film was then treated with a 14% solution of HCl containing Teepol as wetting agent at room temperature (c. 23° C.) to remove the lithium carbonate and Polyox leaving a microporous web of Tefzel. The excess acid and reaction products were removed by washing with distilled water prior to drying of the film. The porosity and pore size distribution of the resulting film, determined according to ASTM D2873-70, using a Coulter porimeter and was found as indicated in the attached Table. Airflow through the membrane was at a pressure difference of 20 psi.

| Run | sz um | Pts Salt | Parts by wght TAIC | Parts PEO | Air Flow* | ** Min | Nom | Max |
|---|---|---|---|---|---|---|---|---|
| A | 6 | 100 | 0 | 22 | <1 | 0.109 | 0.128 | 0.294 |
| B | 6 | 167 | 5.8 | 22 | 2.8 | 0.109 | 0.128 | 0.264 |
| C | 6 | 167 | 6 | 33 | 5 | 0.112 | 0.180 | 0.475 |
| D | 15 | 167 | 6 | 33 | 13.3 | 0.243 | 0.416 | 0.950 |
| E | 15 | 200 | 6.7 | 33 | 22 | 0.271 | 0.465 | 0.822 |
| F | 25 | 167 | 6 | 33 | 16 | 0.300 | 0.473 | 1.133 |
| G | 25 | 200 | 6.7 | 33 | 19 | 0.262 | 0.454 | 1.191 |

Salt = lithium carbonate
TAIC = triallyl isocyanate
**micrometers
*air flow measured in litres per minute

EXAMPLE 7

The procedure of Example 6 was repeated using the grades of polyethylene oxide (Polyox) and the amounts of lithium carbonate and Polyox per 100 parts of Tefzel indicated in the attached table. Formulation 7.1 in the table below contained no triallyl isocyanurate, formulation 7.2 contained 6 parts by weight per 100 parts by weight of Tefzel and formulations 7.3-7.5 contained 7 parts by weight. The wetting agent was altered from Teepol which is a phosphate based anionic wetting agent to Triton x which is a non-ionic wetting agent and is a modified form of polyethylene oxide. The extruded film was rolled to the indicated thicknesses and treated as described. Airflow through the resulting membrane was measured in liters per minute at a pressure difference across the membrane of 20 psi. Volume porosity was measured by density. Surface porosity was measured by taking scanning electron micrographs of the separator surface, enhancing the micrographs to clearly define the porous regions, measuring the area of the porous regions using an image analyser and calculating the percentage of the total area constituted by the area of the porous regions. A tortuosity factor was calculated by measuring the resistance of an electrolyte, measuring the porosity, thickness and area of a piece of the membrane used as separator in a test cell, and measuring the specific conductivity of the electrolyte and the resistance of the separator in the electrolyte. Tortuosity was then calculated according to the formula:

$$T = \left( \frac{k A R_o P}{L} \right)^{\frac{1}{2}}$$

where k represents the specific conductivity of the electrolyte in ohms-1cm-1, Ro is the resistance in ohms of the separator in the electrolyte, A is the area of the separator in sq.cms., P is the porosity and L is the thickness of the membrane. The results show an increase in pore size and in surface porosity on reduction of the molecular weight of from 4 million Polyox WSR 301 to 300,000 (Polyox WSRN 750). A marked increase in pore size, surface porosity, airflow and a marked decrease in tortuosity factor is noted where the molecular weight of the Polyox was reduced to about 100,000 (Polyox N 10). Since ionic conductivity of a separator membrane in a given electrolyte depends upon the porosity and pore structure of the membrane, these differences should result in improved electrical performance.

porosity and more open pore structure of the cell of sample 7.5.

We claim:

1. A method of making a polymeric film which comprises melt processing into a film of polymer composition comprising:
    (a) a halopolymer in which the repeat units are —($C_n H_{2n}$)— and —($C_m X_{2m}$)— where each X independently represents fluorine or chlorine and the values of n and m are greater than one and less than six; and
    (b) an extractable component comprising an extractable salt and an extractable polymer which are substantially insoluble in said halopolymer, said extractable polymer migrating preferably toward the surface of said film during said melt processing; and subsequently extracting at least some of the extractable component so as to produce a film having a porosity of not less than about 20% by volume, said extraction of said extractable polymer imparting surface porosity to said film.

2. A method as claimed in claim 1, in which the extractable salt is present in an amount measured in parts by weight which is greater than the amount of said extractable polymer.

3. A method as claimed in claim 2, in which the extractable salt is present in an amount of from 10 to 150 parts per 100 parts of the halopolymer.

4. A method as claimed in claim 3, in which the extractable polymer, is present in an amount of not more than 60 parts per 100 parts of the halopolymer.

5. A method as claimed in claim 4, in which the extractable polymer is a homo- or copolymer of an alkylene oxide.

6. A method as claimed in claim 5, in which the extractable salt is a lithium salt.

7. A method as claimed in claim 6, in which at least some of the extractable polymer and at least some of the extractable salt are extracted from the polymer composition by means of a single solvent.

8. A method as claimed in claim 1, in which the film is deformed so as to reduce its thickness prior to extraction of the extractable component.

9. A method of making a polymeric film which comprises:
    (a) mixing together a first component which is a

| SAMPLE NO. | PARTS SALT | PARTS PEO | GRADE OF PEO | THICKNESS ($\mu m$) | MEAN PORE SIZE $\mu m$ | AIR FLOW $CM^3 CM^{-2} MM^{-1}$ | VOLUME POROSITY % | SURFACE POROSITY % | TORTUOSITY FACTOR |
|---|---|---|---|---|---|---|---|---|---|
| 7.1 | 100 | 22 | 301 | 40-50 | 0.09-0.15 | 50-100 | 50 | 20 | 4.0 |
| 7.2 | 168 | 27 | 301 | 40-50 | 0.15-0.30 | 200-800 | 60 | 25 | 3.0 |
| 7.3 | 200 | 35 | 301 | 60 | 0.40-0.70 | 1000-1500 | 66 | 30 | 2.0 |
| 7.4 | 200 | 35 | N750 | 60 | 0.70-1.0 | 1000-1500 | 66 | 35-50 | 2.0 |
| 7.5 | 200 | 35 | N10 | 60 | 1.50-3.0 | 5500-12500 | 66 | 52 | 1.5 |

EXAMPLE 8

Test cells of the same construction were fabricated using as separator the materials of samples 7.1 and 7.5 respectively, 1.8 M thionyl chloride as electrode, a porous carbon cathode and a lithium foil anode. The two cells were discharged at a rate of 1 mA/cm² and had operating voltages of 2.60 volts and 3.30 volts respectively. The higher operating voltage of the second cell is believed to have been the result of the increased halopolymer in which the repeating units are —($C_n H_{2n}$)— and —($C_m X_{2m}$)— in which each X independently represents fluorine or chlorine and the values of n and m are greater than one and less than six, more than 150 parts by weight per 100 parts by weight of the halopolymer of a second component which is an extractable salt comprising lithium carbonate, and not more than 80 parts by weight per 100 parts by weight of the halopolymer of a third component which is an extractable polymer selected from the group consisting of polyalkylene oxides and glycols, the extractable polymer being less viscous than the halopolymer and incompatible therewith when both are molten;
(b) melt processing the mixture to form a film in which the extractable polymer has at least partially migrated to the surfaces; and
(c) extracting at least some of the extractable salt to convert the film into a three-dimensional network structure including communicating pores and extracting at least some of said polymer to increase the number of pores opening through the major surfaces of the film, said film having a porosity of more than about 50% by volume.

10. A method according to claim 9, wherein at least some of the extractable polymer and at least some of the extractable salt are extracted from the polymer composition by means of a single solvent.

11. A method according to claim 9, wherein there is mixed with the first, second and third components at least a fourth component which is a process aid or plasticiser.

12. A method according to claim 11, wherein the process aid or plasticiser is triallyl cyanurate or triallyl isocyanurate.

13. A method according to claim 12, wherein the triallyl cyanurate or triallyl isocyanurate are mixed with the first, second and third components is an amount of 1 to 3 parts by weight per 100 parts by weight of the composition.

14. A method according to claim 9, wherein the second component is an alkylene oxide homopolymer or copolymer of molecular weight 50,000–5 million.

15. A method according to claim 9, wherein the second component is polyalkylene oxide e.g. a polyethylene oxide or polyethylene glycol that is solid at room temperature and is of molecular weight less than 1 million.

16. A method according to claim 9, wherein the second component is a polyethylene oxide of molecular weight about 100,000.

17. A method of making a polymeric film which comprises:
(a) mixing together a first component which is a halopolymer in which the repeating units are —($C_nH_{2n}$)— and —($C_m X_{2m}$)— in which each X independently represents fluorine or chlorine and the values of n and m are greater than one and less than six, more than 150 parts by weight per 100 parts by weight of said halopolymer of an extractable salt comprising lithium carbonate having a nominal upper limit of particle size of 15 microns, not more than 80 parts by weight per 100 parts by weight of the halopolymer of an extractable polymer selected from the group consisting of polyalkylene oxides and glycols, said extractable polymer being less viscous than said halopolymer and incompatible therewith when both are molten;
(b) melt processing said mixture to form a film in which said extractable polymer has at least partially migrated to the surface, and further deforming said film to reduce its thickness to less than about 75 microns; and
(c) extracting at least some of said extractable salt to convert said film into a three-dimensional network structure including communicating pores, and extracting at least some of said extractable polymer to increase the number of pores opening through the major surfaces of said film, said film having a mean pore size of greater than about 0.4 microns.

18. A method of making a polymeric film which comprises:
(a) mixing together a first component comprising a halopolymer in which the repeating units are —($C_nH_{2n}$)— and —($C_m X_{2m}$)— in which each X independently represents fluorine or chlorine and the values of n and m are greater than one and less than six, more than 150 parts by weight per 100 parts by weight of said halopolymer of an extractable salt comprising lithium carbonate, not more than 80 parts by weight per 100 parts by weight of said halopolymer of an extractable polymer selected from the group consisting of polyalkylene oxides and glycols, said extractable polymer being less viscous than said halopolymer and incompatible therewith when both are molten, the molecular weight of said extractable polymer being less than about one million;
(b) melt processing the mixture to form a film in which said extractable polymer has at least partially migrated to the surface and further deforming said film to reduce its thickness to less than about 75 microns; and
(c) extracting at least some of said extractable salt to convert said film into a three-dimensional network structure including communicating pores, and extracting at least some of said extractable polymer to increase the number of pore openings through the major surfaces of said film, said film having a porosity of not less than about 55% by volume and an airflow through said film of at least about 200 $cm^3 cm^{-2} min^{-1}$ at 20 psi.

* * * * *

UNITED STATES PATENT AND TRADEMARK OFFICE
CERTIFICATE OF CORRECTION

PATENT NO. : 5,198,162
DATED : March 30, 1993
INVENTOR(S) : Park et al

It is certified that error appears in the above-indentified patent and that said Letters Patent is hereby corrected as shown below:

On the title page: Item

[75] delete "David J. Barker" and insert therefor --John B. David--.
Column 4, line 12, delete "$H_{2n}$)" and insert therefor --$H_{2n}$)--.
Column 11, line 68, "1,2-dimenthoyoxyethane" should read --1,2-dimethyoxyethane--.
Column 12, line 52, delete "__________" and insert therefor --___Pore Size ___--.
line 62, delete "**micrometers".
line 64, insert --**micrometers--.

Signed and Sealed this

Twenty-eighth Day of December, 1993

Attest:

BRUCE LEHMAN

Attesting Officer          Commissioner of Patents and Trademarks